Aug. 30, 1932.     H. W. GOODALL ET AL     1,874,284
HOSE COUPLING
Filed Sept. 27, 1930

WITNESS:
Rob R Mitchel.

INVENTORS
Howard W. Goodall
Joseph W. Walsh
BY Augustus B. Stoughton
ATTORNEY.

Patented Aug. 30, 1932

1,874,284

UNITED STATES PATENT OFFICE

HOWARD W. GOODALL, OF ALDAN, AND JOSEPH W. WALSH, OF PHILADELPHIA, PENNSYLVANIA

HOSE COUPLING

Application filed September 27, 1930. Serial No. 484,847.

The present invention relates more particularly to hose couplings which are employed for connecting a hose to a device which is used among other things for cleaning boiler tubes which may be straight or curved.

Objects of the invention are to hold the coupling by the wire which is in most cases wound spirally so that if the hose breaks the coupling will not fly through a straight boiler tube, likely causing injury when it escapes or jam in a curved tube from which it has to be extracted by fishing; to provide a coupling possessed of the advantage of connection with the wire of the winding of the hose and yet of sufficiently limited dimensions to permit it to pass into or enter boiler and like tubes, and to provide a compression type of coupling which will clamp the hose against leakage in a satisfactory manner and will provide for subsequent take up motion or adjustment.

Other objects of the invention will appear from the following description at the end whereof the invention will be claimed.

Generally stated, the invention may be said to comprise a coupling for hose with spiral wire winding including a tubular stem adapted for insertion into the end of the hose and a collar adapted to surround the hose and having threaded engagement with the stem, there being provided inwardly correspondingly tapered end surfaces on the stem and collar, segments in the form of a diagonally cut ring and having tapered end surfaces corresponding to the first mentioned tapered surfaces and arranged to cooperate therewith to compress the hose end onto the stem, and the inner face of said segments being concave for the accommodation of the end part of the wire winding, and one of said segments having means by which the wire end is attached thereto.

The invention also comprises the improvements to be presently described and finally claimed.

In the following description reference may be made to the accompanying drawing forming part hereof and in which, Figure 1 is a view principally in central section illustrating a coupling embodying feature of the invention.

Figure 1:
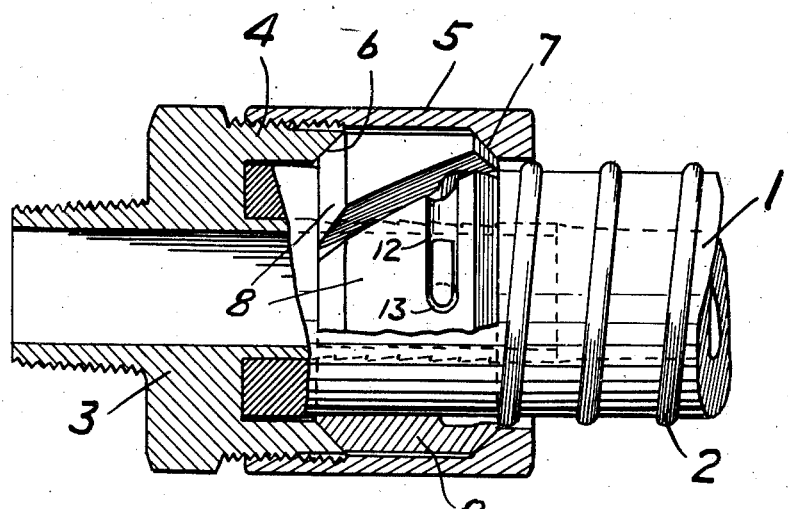
Figure 2:
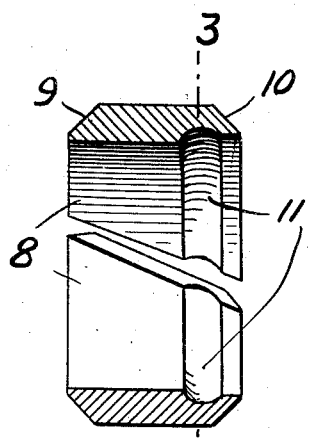
Figure 2 is a sectional view showing two of the segments detached.
Figure 3:
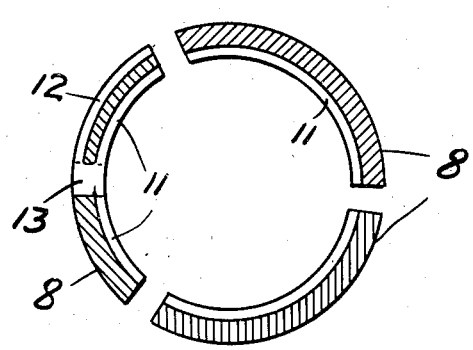
Figure 3 is a sectional view taken on the line 3—3 of Figure 2.

Referring to the drawing, 1 indicates a hose having a spiral wire winding 2. 3 is a tubular stem adapted for insertion into the end of the hose and having an externallly threaded hollow neck 4. 5 is a collar adapted to surround the hose and threaded for engagement with the stem. Inwardly and correspondingly tapered end surfaces 6 and 7 are provided on the stem and collar. Segments 8 of the form of a diagonally cut ring are provided and they have tapered end surfaces 9 and 10 corresponding to the tapered surfaces 6 and 7. The tapered surfaces 9 and 10 cooperate with the tapered surfaces 6 and 7 when the collar is screwed onto the stem 3 to compress the hose end onto the stem. The inner face of the segments is concave or grooved as at 11 for the accommodation of the end part of the wire winding and one of these segments is provided with a hole 13 through which the end of the wire winding 2 is passed and bent back into an external groove 12 provided on the outside of the segment.

In use the coupling is secured to the wire winding 2 so that if the hose 1 should break the coupling will be connected with the wire and cannot escape. The diagonally disposed edges of the segments, when the latter is clamped on the hose so as to compress it, tend to oppose leakage between the hose and the stem, because if the spaces between the segments were parallel to the axis of the stem there would be a tendency for leakage to occur in axial direction along between the stem and hose following the direction of the spaces between the adjoining edges of the segments. The concavity 11 by accommodating the wire winding 2 prevents the latter from being unduly compressed into the hose when compressed onto the stem by the segments. The groove 12 by accommodating the end of the wire winding, which is passed through the hole 13, permits the outside dimensions of the coupling to be within the proper limits. The compression produced by the tapered surfaces 6, 9, 7 and 10 is rapidly applied by comparatively few turns of the collar 5 in respect to the stem leaving considerable of the thread available for further or future adjustment.

It will be obvious to those skilled in the art to which the invention relates that modifications may be made in details of construction and arrangement and matters of mere form without departing from the spirit of the invention which is not limited as to those matters or otherwise than the prior art and the appended claims may require.

We claim:

1. In a compression coupling for hose with spiral wire winding in contact with the outer surface of the hose, the combination of a tubular stem adapted for insertion into the end of the hose and having an externally threaded hollow neck and a collar adapted to surround the hose and threaded for engagement with the neck, there being provided inwardly and correspondingly tapered end surfaces on the neck and collar, and segments of the form of a diagonally cut ring and having tapered end surfaces corresponding to the first mentioned tapered surfaces and arranged for cooperation therewith to compress the hose end onto the stem, and the inner face of said segments being concave for the accommodation of the end part of the wire winding and one of said segments having a hole and an external groove by which the wire end is attached thereto.

2. In a compression coupling for hose with spiral wire winding in contact with the outer surface of the hose, the combination of a threaded tubular stem adapted for insertion into the end of the hose and a collar adapted to surround the hose and threaded for engagement with the stem, there being provided inwardly and correspondingly tapered end surfaces on the stem and collar, and segments of the form of a diagonally cut ring and having tapered end surfaces corresponding to the first mentioned tapered surfaces and arranged to cooperate therewith to compress the hose end onto the stem, and the inner face of said segments being concave for the accommodation of the end part of the wire winding and one of said segments having means by which the wire end is attached thereto.

HOWARD W. GOODALL.
JOSEPH W. WALSH.